United States Patent [19]

Kocher

[11] 4,333,978

[45] Jun. 8, 1982

[54] METHOD AND APPARATUS FOR PRODUCING A COMPOSITE MATERIAL HAVING ULTRASONICALLY WELDED SEAMS WHICH CONFINE STRANDS

[76] Inventor: Walter Kocher, Mozart Strasse 11, 8671 Selbitz, Fed. Rep. of Germany

[21] Appl. No.: 226,522

[22] Filed: Jan. 19, 1981

Related U.S. Application Data

[63] Continuation-in-part of Ser. No. 105,295, Dec. 19, 1979.

[30] Foreign Application Priority Data

Mar. 29, 1979 [DE] Fed. Rep. of Germany ... 7909013[U]
Jul. 18, 1979 [DE] Fed. Rep. of Germany ....... 2928941
Feb. 13, 1980 [EP] European Pat. Off. ........ 80100728.7

[51] Int. Cl.$^3$ ..................... B06B 3/00; B29C 27/08; B32B 3/22; B32B 31/21; B65B 11/00
[52] U.S. Cl. .................................... 428/158; 156/70; 156/73.1; 156/73.5; 156/164; 156/165; 156/201; 156/229; 156/250; 156/257; 156/383; 156/494; 156/495; 156/580.1; 428/162; 428/163; 428/167; 428/173; 428/178; 428/188; 428/195; 428/294
[58] Field of Search .................. 156/70, 73.1, 73.5, 156/164, 165, 201, 229, 250, 257, 383, 494, 495, 580.1; 428/158, 162, 163, 173, 178, 188, 167, 195, 294

[56] References Cited

U.S. PATENT DOCUMENTS

| | | | |
|---|---|---|---|
| 1,470,465 | 10/1923 | Marquette | 428/163 |
| 3,075,862 | 1/1963 | Hayer | 428/163 |
| 3,418,196 | 12/1968 | Lul | 156/73.1 |
| 3,517,805 | 6/1970 | Gould | 428/188 |
| 3,733,238 | 5/1973 | Long et al. | 156/580.1 |
| 3,833,439 | 9/1974 | Smith | 428/163 |
| 3,844,876 | 10/1974 | Wilson et al. | 428/163 |
| 3,879,256 | 4/1975 | Rust | 156/73.1 |
| 4,079,568 | 3/1978 | Wortman | 428/294 |

FOREIGN PATENT DOCUMENTS 1366481 9/1974 United Kingdom ................ 428/294

*Primary Examiner*—James C. Cannon
*Attorney, Agent, or Firm*—Fred A. Keire

[57] ABSTRACT

A composite material and a method for producing a composite material of a highly, multidirectionally elastic nature which includes ultrasonically welding an upper layer to a lower layer along substantially parallel, spaced apart weld seams, feeding elongated strands of an intermediate layer between the upper and lower layers and between the weld seams during the welding operation, and applying a tensile stress to at least one of the upper, lower and intermediate layers during the welding operation with such tensile stress being different from the tensile stress on at least another of the upper, lower and intermediate layers. Apparatus for performing the above method includes a plurality of spaced apart, disc-like anvil plates having circumferential teeth and fixedly secured to a common shaft for rotation therewith, an oscillating member disposed above the anvil plates for ultrasonically welding an upper layer to a lower layer along substantially parallel, spaced apart weld seams determined by the spacing of the anvil plates, feed tubes for feeding elongated strands of material of an intermediate layer between the upper and lower layers and between the weld seams during the welding operation, and a pair of rollers associated with each of the upper, lower and intermediate layers for supplying each of the respective layers to the anvil plates and for applying a variable tensile stress to the respective layers supplied to the anvil plates.

24 Claims, 3 Drawing Figures

METHOD AND APPARATUS FOR PRODUCING A COMPOSITE MATERIAL HAVING ULTRASONICALLY WELDED SEAMS WHICH CONFINE STRANDS

REFERENCE TO RELATED APPLICATION

This is a Continuation-In-Part application of U.S. patent application Ser. No. 6/105,295, filed Dec. 19, 1979 for COMPOSITE MATERIAL, METHOD FOR ITS MANUFACTURE, AND APPARATUS FOR THE CARRYING OUT OF THE METHOD.

BACKGROUND OF THE INVENTION

This invention relates generally to a method and apparatus for producing a composite material and, more particularly, is directed to a method and apparatus for producing a composite material of a highly elastic nature.

Three-layer and other multi-layer composite materials are known in which the joining of the layers is generally effected by stitching, bonding, flame-bonding, high-frequency welding or the like. However, all of the above methods have proven disadvantageous for one reason or another. For example, one disadvantage of stitching is that holes are made in the material so that water-tight products cannot be made therefrom. A disadvantage of bonding is that a solvent is required which must be evaporated by the application of heat thereto. Furthermore, in the case of flame-bonding of a foam, the foam must be heated to a temperature above its melting point, which requires a considerable amount of heat and causes dangerous gases to be produced. These gases must be eliminated according to laws generally governing the protection of the environment and this elimination can be done only at great expense. High-frequency welding can, as a rule, be effected only discontinuously. However, one serious disadvantage of the high-frequency method is that only a few materials can be welded together, namely, ones that have a suitable dielectric loss angle tan δ, for example, non-rigid PVC with a tan δ equal to about 0.1 at a frequency of $10^6$ Hz, in contradistinction to polyethylene with a tan δ equal to about 0.0005 at the same frequency, the latter of which cannot be welded by the high-frequency method. Plastic coated metals can also not be welded by the high-frequency method.

Furthermore, it is known to produce composite materials having an upper layer, a lower layer, and a non-woven web as an intermediate layer by an ultrasonic spot welding method. However, a prerequisite for the manufacture of such composite materials has been that the materials of all three layers have the same or similar vibration properties so that they can be welded by ultrasonic frequencies. In practice, this requirement greatly limits the opportunity to use this method. For example, it is not possible with this method to join two outer layers of synthetic textile materials, which are capable of oscillation, with intermediate layers of a plastic foam, such as thick layers of polyurethane or polyethylene, synthetic rubber, or non-woven webs of wool, cotton, cellulose derivations, materials which have been impregnated or provided with a water-resistant finish, metals, paper, or the like. Also, a problem with such composite materials having intermediate layers of non-woven webs is that such composite materials are only slightly elastic since the non-woven materials therein are, as a general rule, inelastic or only slightly elastic.

It is therefore desirable to obtain, in an inexpensive and simple manner, composite materials having multidirectional elasticity and having an upper layer and an ultrasonically joined lower layer and an intermediate layer of any desired material without the necessity of making holes in the outer layers, as in the case of stitching, and without having to externally heat the materials, as in the case of welding.

It has been proposed in my copending U.S. patent application Ser. No. 06/105,295 to produce composite materials which have an upper layer, a lower layer secured to the upper layer along substantially parallel, spaced apart, ultrasonic weld seams, and an intermediate layer comprised of individual strands of material which lie substantially parallel to the weld seams between the latter in channels formed by the upper and lower layers. In the aforementioned copending application, the method therein is carried out with an apparatus comprised of a vibration or oscillating body used for ultrasonic welding, anvil plates which are spaced apart from each other in a parallel relationship, and guides for guiding the strands of material of the intermediate layer along with the upper layer and lower layer between the spaced apart anvil plates and the oscillating body.

Although the method and apparatus described in the aforementioned application results in a composite material of an elastic nature, it is desirable to provide still greater elasticity in the composite material and to be able to control the amount of elasticity therein.

BRIEF DESCRIPTION OF PATENTED PRIOR ART

In U.S. Pat. No. 4,079,568 is described a composite material of a textile upper and lower layer and sandwiched therebetween a synthetic fiber or tow elements in a parallel, spaced apart pattern. Additional transverse stitch lines are also provided so as to maintain the segments in place, to prevent riding, lumping, and shifting of the tow elements within the surface material. However, these types of material are not elastic because synthetic tow or bulked fibers have minimal bulk elasticity; and hence, during compression such composites have poor heat insulation characteristics.

In U.S. Pat. No. 3,844,876 is described a laminate of polyurethane foam and an upper layer therefor. In this composite the foam is covering the entire surface of the upper layer. By application of heat, for bonding purposes, to substantially parallel regions, the foam is densified and compressed permanently so as to form strands of the foam material. However, these composite materials lack freely moving foam in conduits therefor. Because of the parallely densified foam regions, the entire foam layer covered composite is stiff, has a poor "hand" and is not useful as source material for elastic composites.

In U.S. Pat. No. 3,517,805 is described a laminate of at least one flexible material, on which linelike homogeneous deposits of thermosetting resins and filter material are deposited with the aid of a glue. When heat and pressure are applied, the resin polymerizes and tightly adheres to the flexible material. These laminates, however, are not useful as textile materials for garments.

U.S. Pat. No. 1,470,465 discloses rubber strands which are joined through a textile material. Further, U.S. Pat. Nos. 3,075,862 and 3,833,439, as well as United Kingdom Pat. No. 1,366,481, disclose stiff materials of laminated structure, e.g. for building purposes, but not useful as textile materials.

Finally, U.S. Pat. Nos. 3,733,238 and 3,879,256 disclose devices useful for joining ultrasonically, by parallel stitch lines, co-extensive flat laminae.

OBJECTS, EMBODIMENTS AND SUMMARY OF THE INVENTION

Accordingly, it is an object of this invention to provide a multidirectionally elastic composite of an upper layer, an intermediate layer and a lower layer joined ultrasonically together, as will be described hereinafter in greater detail; further an ultrasonic welding method and still further apparatus for producing a composite material of a highly elastic nature.

It is another object of this invention to provide an ultrasonic welding method and apparatus for producing a composite material of highly desired elasticity characteristics.

It is still another object of this invention to provide an ultrasonic welding method and apparatus for producing a composite material formed of upper, lower and intermediate layers with at least one of the upper, lower and intermediate layers having a tensile stress (tension) applied thereto which is different from the tensile stress (tension) on at least another of the upper, lower and intermediate layers and where the ultrasonically joined seams are substantially parallel to each other and spaced apart and where the intermediate material may be in the channels formed between the seams and further may be e.g. not under tension.

In accordance with an aspect of this invention, a method of producing a composite material of the type having an upper layer, a lower layer and an intermediate layer disposed between the upper layers and the lower layer, comprises the steps of ultrasonically welding the upper layer to the lower layer along substantially parallel, spaced apart weld seams, feeding the intermediate layer between the upper layer and the lower layer during the step of ultrasonically welding, and applying a tensile stress, to at least one of the upper, lower and intermediate layers, during the step of ultrasonically welding which is different from the tensile stress on at least another of the upper, lower and intermediate layers. As a result of the difference in the tensile stress (tension) in one or more layers, the remaining layers or the intermediate layer is lengthwise shortened so that the non-tensioned layer(s) of the composite has a crimped appearance or, for example for a knitted material, may cause the knitted fabric texture to contract and thus to densify.

When the composite material contains foam layers in the form of foam laminates these can then be of foam and at least another material layer preferably of an elastic material such as synthetic material layer, textile material, metal and the like. These foam laminates in the form of strands may, or may not, however, be joined at the ultrasonically welded seams to the upper and/or lower layer. When not joined these strands are unrestrainingly disposed in the conduits formed between the two layers.

In accordance with another aspect of this invention, apparatus for producing a composite material of the type having an upper layer, a lower layer and an intermediate layer disposed between the upper layer and the lower layer, comprises welding means for ultrasonically welding the upper layer to the lower layer along substantially parallel, spaced apart weld seams, feeding means for feeding the intermediate layer to the welding means between the upper layer and the lower layer, and tension means for applying a tensile stress to at least one of the upper, lower and intermediate layers supplied to the welding means which is different from the tensile stress of at least another of the upper, lower and intermediate layers.

In accordance with the above, the various materials, including the intermediate materials are fed into or through the ultrasonic welding apparatus so that in the welding zone these materials are at a different tensile stress. Surprisingly, when the material under tensile stress has a retractive recovery, or good resilient capacity, then the elasticity of the composite material is also further improved. Further, in accordance with the invention, composite materials are obtained which have properties not demonstrated by either or any of the layers but have desirable properties from each such as from knitted materials, terry cloth, and crimped or smooth fabrics. For example, the upper layer may be of a water-repellant, wind-proof, smoothly woven material such as a nylon, the intermediate material of polyurethane foam strands and the lower layer of an elastically working textile material (i.e. made of elastic yarns or strands) or of a knitted fabric. When the upper and lower layers are fed for example, almost without tensile stress, but the intermediate layer (which is of a foam or of a foam laminate of a great recovery or resilience capacity) is fed while under considerable tension, then one can obtain, after ultrasonic welding and release of the stresses in the composite, a two or three dimensionally elastically workable composite, whose great machine direction elasticity is the result of the resilient recovery properties of the intermediate layer and the result of the properties from the contraction of the upper and lower layer, while the cross-direction elasticity is the result of the sidewise contraction and volumewise increasing, profiled layers caused by the resilient recovery of the intermediate material strands.

The above-described composites are useful for different purposes, especially as sports apparel, upholstery material for furniture or cars, or apparel for use on or in water such as floatation aids, or for heat or wind insulation e.g. hypothermia prevention, which as a result of the high elasticity conform to the body or body motions.

The above, and other, objects, features and advantages of the invention, will be apparent in the following detailed description of an illustrative embodiment of the invention which is to be read in connection with the accompanying drawings.

DETAILED DESCRIPTION OF A PREFERRED EMBODIMENT

Figure 1:
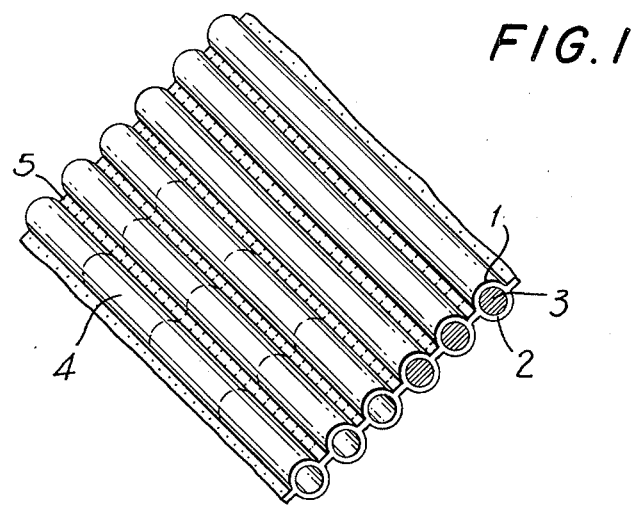
FIG. 1 is a perspective view of a portion of a composite material made with the apparatus and according to the method of this invention.

Referring to the drawings in detail, and initially to FIG. 1 thereof, a composite material made in accordance with this invention is shown to be comprised of an upper layer 1, a lower layer 2, and an intermediate layer 3 consisting of strands of material, for example, foam cables. The strands of material may also be formed from polyurethane, polyethylene, synthetic rubber, non-rigid polyvinyl cloride, non-woven webs of polyester, polyamide, silicon-treated fibers, wool, cotton, cellulose derivatives, non-rigid or rigid plastic foils in the form of strips or other shapes, rubber strips, rubber bands, strands of paper, metal in the form of strips, spiral springs, wire windings, rods or wires, or the like. However, for many purposes, it is preferred for the strands of material to consist of a foam, since foam is heat insulating and contains a relatively large amount of air. The composite material can then be used, for example, for water-sports clothing since the composite material would then be heat insulating, shock-dampening and water impervious and, at the same time, such composite material could serve as a floating aid. It should be appreciated that reference to strands of material herein is intended to indicate shaped bodies the length of which is greater than their width of thickness. It is, however, intended that shaped members of any desired configuration, such as strips, bands, tubes, spiral windings or similar structures, may be utilized.

As described more fully in the aforementioned copending application, the disclosure of which is incorporated herein by reference, upper layer 1 and lower layer 2 are made of ultrasonically weldable material and are ultrasonically spot welded to each other along substantially parallel, spaced apart, weld seams 5 so as to enclose the strands of material in channels formed therebetween. It is therefore preferable that the strands of material consist of a material which is not capable of ultrasonic welding so as not to adhere along weld seams 5 to the upper and lower layers, but instead, lie free and movable within the channels. This increases the elasticity of the composite material. However, it should be appreciated that the strands of material of the intermediate layer can be made of a material capable of being welded ultrasonically to the upper and lower layers 1 and 2, respectively, if desired. It should further be appreciated that when reference is made to weld seams, it is intended, as customary in ultrasonic welding, that spot welds are arranged in, spaced apart, parallel lines, in accordance with this invention, so that the overall effect is similar to a corresponding continuous weld seam.

Further, although the materials used for the upper and lower layers may differ, it is preferable that at least one of the outer layers of the composite material, namely, the upper layer or the lower layer, consist of an elastic material. For use of the composite material for clothing, it is, of course, desirable for both outer layers to consist of elastic materials, such as sheets, possibly plastic coated textiles, netting or the like. For certain purposes, however, it is also possible to join together two inelastic sheets or an inelastic sheet and an elastic sheet, for example, two aluminum sheets or an aluminum sheet with a plastic sheet. Since metal foils are not capable of high-frequency welding, they can be used in accordance with this invention only if they are provided with a coating which is capable of ultrasonic welding.

However, if elastic materials are used for the upper and lower layers in the composite material according to this invention, high elasticity is achieved in the direction perpendicular to the length of the strands of material of the intermediate layer, since the strands of material which lie perpendicular to the direction of tension do not impair the elasticity of the composite material. If a material of high elasticity is not used as the material for the intermediate layer, then the elasticity of the composite material is substantially less in the lengthwise direction of the strands of material of the intermediate layer than it is in the direction perpendicular thereto.

Further increase in the elasticity of the composite material can be obtained if the strands of material are subdivided, at least in part, in the transverse direction. For example, the subdivisions can be effected every one to three centimeters. In this way, a composite material is obtained which has excellent elasticity in all directions of tension and therefore constitutes an excellent material for articles of clothing, such as sports clothing. This is particularly true if the tranversely subdivided strands of material consist of foam rods. This is seen more particularly with reference to FIG. 1 which shows two embodiments simultaneously therein. In the right-hand side of FIG. 1, the strands of material 3 consist of continuous foam cables, while in the left-hand side of the drawings, they consist of individual foam cylinders 4, at least partially separated from each other (subdivided in the tranverse direction), which lie one behind the other and together form the strands of material.

This subdivision can be obtained after the welding operation by briefly impressing a heated punch-like device onto the composite material. The punch-like heatable device may, for example, be a metal sheet of a thickness of 0.5 to 1.0 mm which is pressed onto the material in reciprocating movements, the rate of which is adjustable, or the device may be a milled, heatable, gear-like roller which is impressed, upon rotation thereon, onto the composite material. In such case, the materials should be selected so that the strands of material have a melting point or melting range below that of the upper and lower layers and the temperature of the punch-like device is adjusted so that it is below the melting point or melting range of the upper and lower layers but at least as high as the melting point or melting range of the strands of material to be subdivided.

It is also possible to introduce the strands of material, already in subdivided form, between upper layer 1 and lower layer 2 by inserting them in the form of successive individual pieces between the two layers. In order to facilitate this process, one can use strands of material which have been subdivided into individual pieces in such a manner that the individual pieces are still attached to each other over an uncut small portion of the strand cross-section or are preferably connected to each other by a strip of an elastic material such as a thin strip of foam.

In this latter variation of the method, a closed-cell polyethylene foam having a weight of 33 kg/m$^3$ and a thickness of 5 mm is, for example, bonded by flame-bonding to a polyurethane foam sheet having a base of polyester with a weight of 30 kg/m$^3$ and a thickness of 1.8 mm. In this regard, the materials are selected so that the thicker strand of material has a lower melting point than the thinner polyurethane foam sheet. If a punch-like device whose temperature is maintained between the melting points of the two foam materials is now impressed at regular intervals on the laminate, the polyethylene foam, but not the polyurethane foam sheet having a polyester base, is subdivided into individual pieces so that the individual pieces of the thicker polyethylene foam strand remain connected with each other by means of the polyurethane foam strips. This facilitates the introduction of the pieces between upper layer 1 and lower layer 2 without impairing the elasticity of the finished composite material. As compared with the case of subsequent subdivision of the strands of material after welding, this embodiment also has the advantages that energy is saved for heating the upper layer, substantially higher speeds of passage are obtained, and the outer layers of the composite material are assured gentle treatment.

It should be appreciated that the composite materials made according to this invention may be used, for example, for sports and work clothing, insulation against cold, heat and sound, insulating and floating bodies, highly elastic, insulating, physiologically functional clothing or parts thereof, for heating blankets of medical instruments, bag and luggage articles, for fashion accessories, for upholstery materials for chairs, automobile interior fittings, baby carriage fittings, motorcycle saddles and the like. Due to their water-tightness, heat-insulating properties and floating properties, these composite materials are particularly well-suited as water sports clothing which, at the same time, constitute a floating aid. In contradistinction to stitched composite materials, the surfaces of the outer layers of the composite materials according to this invention remain without holes and therefore water-tight. When used for seat coverings, such as for automobile seats and the like, an open-pore foam is advisedly used for the strands of material and a water-vapor-pervious material at least as an upper layer. Perspiration then passes through the upper layer into the pores of the foam and is pumped from pore to pore through the foam to the lower layer as a result of movement of the person seated thereon.

In accordance with the present invention, and as briefly described before, the webs of material forming upper layer 1 and lower layer 2 are welded to each other while under different tensile stress. In other words, the webs of material and the strands of material of the intermediate layer are fed to the ultrasonic welding apparatus in such a manner that they have a different tensile stress in the region of the welding operation. Surprisingly, it has been found that if the material which is under greater tensile stress is resilient, an improvement in the elasticity of the composite material is obtained. Accordingly, it is thus possible to produce composite materials which combine the properties of different fabrics, such as a woven fabric and a knitted fabric. For example, the upper layer may consist of a water-repellent, wind-impervious, smooth woven fabric (for example, polyamide), the intermediate layer may consist of strands of polyurethane foam, and the lower layer of an elastic knitted fabric. If the lower layer has sufficient resiliency and if it is fed under longitudinal tension to the ultrasonic welding apparatus, together with the effectively tension-less upper and intermediate layers, upon relaxation of the composite material after it passes the welding apparatus, a multidirectionally elastic composite material is obtained. In other words, the composite material has a high longitudinal elasticity which results from the resiliency of the lower layer which pulls the upper and intermediate layers along with it, thus shortening their length, i.e. contracting, while the transverse elasticity results from the laterally shortened, i.e. contracted, bulky profiled surface, as a result of the strands of material of the intermediate layer.

In general, the tensile stressing of the webs of material is effected in the longitudinal direction thereof with the difference in tensile stress preferably being produced by feeding one of the layers to the welding point of the apparatus in such a manner that it is stretched at such point to a value of 1.1 to 1.6, and preferably 1.3 to 1.5, with respect to one of the two other layers or with respect to both other layers. In this manner, either the lower layer alone or the upper layer alone would be under longitudinal tension while the strands of material of the intermediate layer would not be longitudinally stressed or would be under only slight longitudinal tension. Alternatively, it should be appreciated that the upper and lower layers can have a greater longitudinal tension than the intermediate layer, or that the lower layer and intermediate layer or the upper layer and intermediate layer can be under a greater longitudinal tension than the upper layer or lower layer, respectively. Depending on which of the layers has imparted thereto a greater longitudinal tension, how great the resilience of the more strongly tensioned layer is, and how the quantitative difference of the longitudinal tension is adjusted, different composite materials are obtained which may be preferred for different uses.

The strands of material of the intermediate layer can also be inserted under longitudinal tension between effectively non-tensioned upper and lower layers 1 and 2. Composite materials manufactured in this way are particularly suitable as upholstery materials for articles of furniture where it is desired to easily cover shaped bodies so as to be free of wrinkles.

The different tensile stresses of the webs or strands of material can be obtained by feeding them to the point of weld in the ultrasonic welding apparatus over individually adjustable, and preferably continuously adjustable, rollers or pairs of rollers which rotate at different speeds so that, as desired and required, one of the webs of material of the upper or lower layer or the strands of material of the intermediate layer can be held under greater tensile stress at the point of weld than the other materials.

Figure 2:
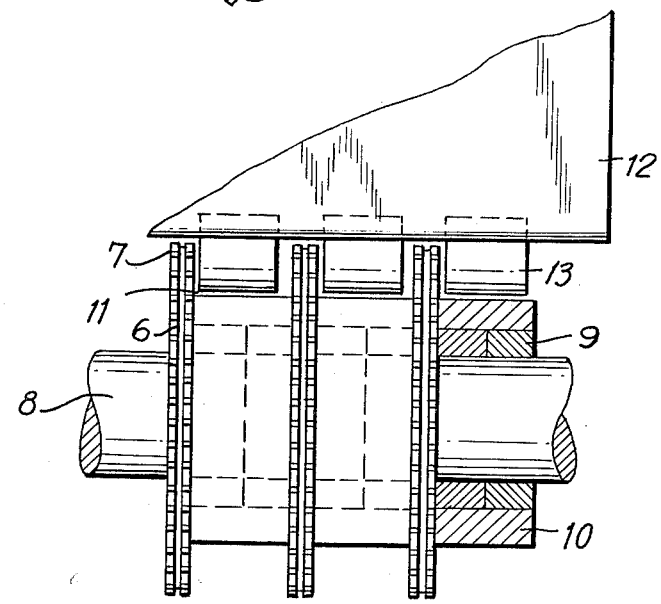
FIG. 2 is a schematic front plan view of the apparatus according to this invention.
Figure 3:
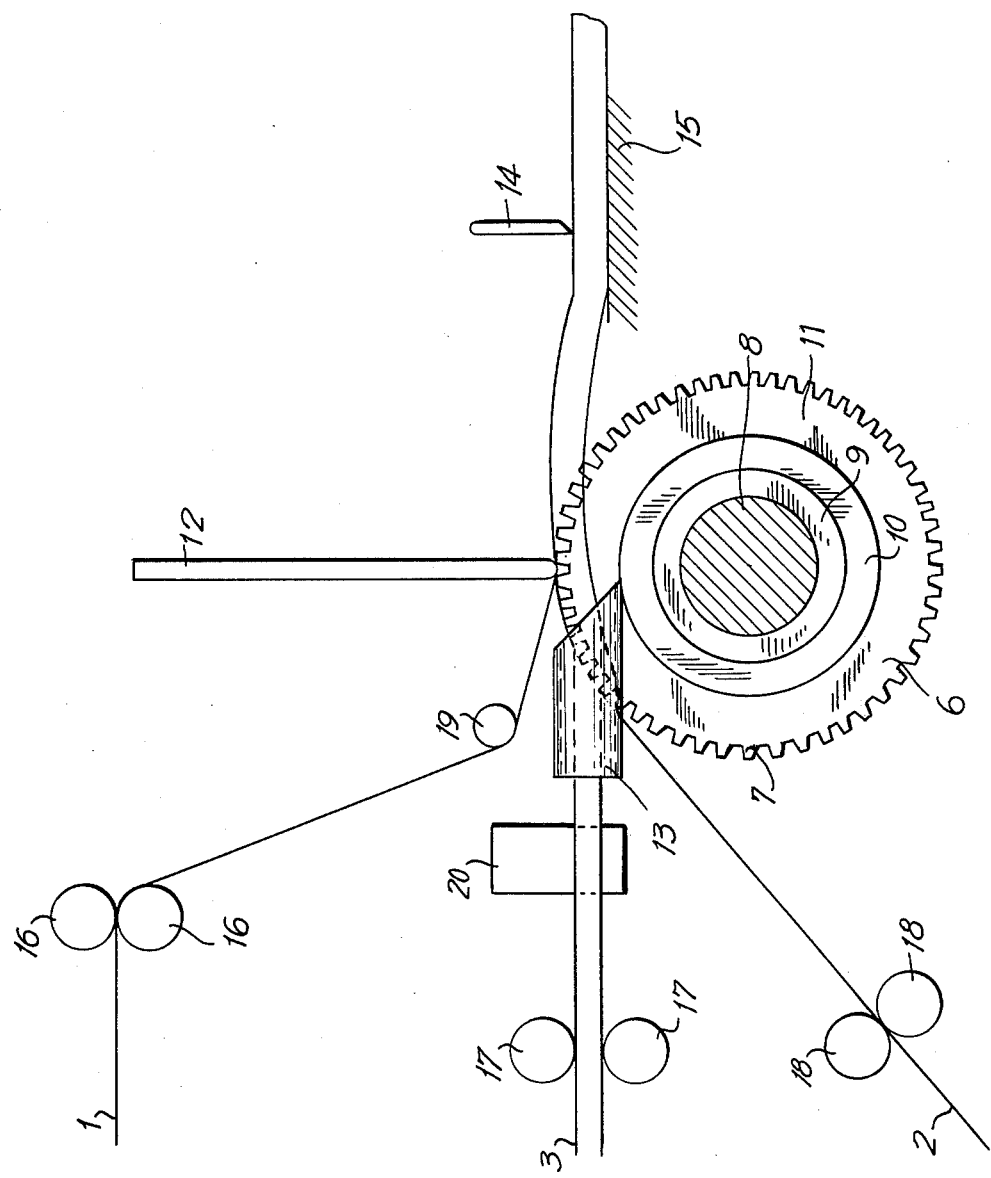
FIG. 3 is a schematic elevational view of the apparatus of FIG. 2.

Referring now to FIGS. 2 and 3, there is schematically shown an apparatus for carrying out the method of forming a composite material according to this invention. The apparatus includes annular, disc-shaped anvil plates 6, for example, of high-grade steel, each having two annular rows of projections or teeth 7 which are used for the spot welding operation so as to form weld seams 5. Although only three anvil plates 6 are shown in FIG. 2, it is to be appreciated that any number of plates may be used, depending on the size of the composite material desired. Anvil plates 6 are secured to a common shaft 8 to rotate therewith and are maintained in a fixed position, preferably in pairs as shown in FIG. 3, by spacers 9 which are preferably in the form of small steel rings. Spacers 9 are annularly surrounded by fillings rings 10 which partially fill the spaces between adjacent anvil plates 6 so that an annular peripheral recess 11 remains between each pair of anvil plates 6. By changing the width of spacers 9 and filling rings 10, the distances between adjacent anvil plates 6 can be adjusted.

A vibration or oscillating member 12, that is, a sonotrode, is provided above anvil plates 6 in a position substantially parallel with shaft 8 and adapted to press against the top of anvil plates 6. Vibration member 12 may be of the type manufactured by Branson-Sonic Power in Danbury, Connecticut. In this regard, as upper layer 1 and lower layer 2 pass between vibration member 12 and anvil plates 6, they are ultrasonically spot welded by vibration member 12 along weld seams 5.

The web of material of upper layer 1 is fed with an adjustable tensile stress between vibration member 12 and the top of anvil plates 6 by means of a continuously variable pair of rollers 16 and a guide roller 19. In like manner, lower layer 2 is fed with an adjustable tensile stress between vibration member 12 and the top of anvil plates 6, at a position below upper layer 1, by means of a continuously adjustable pair of rollers 18. The intermediate layer is also fed with an adjustable tensile stress between upper layer 1 and lower layer 2. Preferably, intermediate layer 3, in the form of a sheet, for example, a foam sheet, is fed with an adjustable tensile stress by means of a continuously variable pair of rollers 17. It should be appreciated that the amount of tensile stress on any one of layers 1-3 is obtained by varying the speed of anvil plates 6 and each pair of rollers 16, 18, and 17, respectively. The sheet of intermediate layer 3 is then subdivided into individual strands which are parallel and spaced apart from one another by parallel arranged knives 20. The individual strands are then individually fed through feed tubes 13 into peripheral recesses 11 so as to be positioned in a parallel and spaced apart manner between upper layer 1 and lower layer 2. Thus, as upper layer 1 and lower layer 2 pass between vibration body 12 and anvil plates 6, they are pressed together and ultrasonically welded along weld seams 5 with the strands of intermediate layer 3 being located between weld seams 5. In this manner, a composite material having a desired amount of elasticity is produced.

Further, as previously described, it may be preferable to cut the strands of intermediate layer 3 in the transverse direction thereof in order to increase the elasticity thereof. Such subdivision can be effected by a heated punching knife 14, as shown in FIG. 3, which presses, at regular intervals, against the composite material which travels over a surface 15. The temperature of knife 14 is below the melting point of upper layer 1 and lower layer 2 and above the melting point of intermediate layer 3 so that the strands of intermediate layer 3 are cut through, in whole or in part, at the points of contact with knife 14.

The following examples serve further to explain the method and apparatus according to this invention.

EXAMPLE 1

Two warp-knit fabrics forming upper layer 1 and lower layer 2, each having a weight of 150 g/m$^2$ and consisting of 18% "Elasthan" (polyurethane fiber) and 82% polyamide were welded together along parallel, spaced apart weld seams so as to produce parallel extending hollow spaces into which foamed polyethylene having a weight of 30 kg/m$^3$ and a cylindrical configuration with a diameter of 10 mm were endlessly inserted. The formed composite material was then moved, with a pressure of about 1 bar, below a roller milled into the configuration of a gear wheel and heated to about 150° C. The gear wheel was dimensioned so that the teeth or ribs thereof had a depth of about 15 mm and, at the place of application, a thickness of 0.77 mm. The milled roller also had a diameter of about 150 mm and the peripheries of the ribs were spaced apart about 15 mm. The ribs were adjustably heated from the inside by circulating oil. With a work width of 1200 mm, the milled roller or gear wheel divided the endless intermediate material of foamed polyethylene, at a rate of about 5 to 7 m/minute, into individual cylindrical pieces of a length of about 15 mm.

EXAMPLE 2

A fabric of polyamide forming the upper layer and having a water repellent finish and a weight of 60 g/m$^2$ was welded with a circular knit pile fabric of 25% polyamide yarn HE ("high elastic") and 75% cotton yarn forming the lower layer and having a weight of about 230 g/m$^2$ in an ultrasonic welding apparatus according to this invention with the weld seams being spaced apart by a distance of 16 mm. The apparatus also had an anvil width of 4 mm. Further, the elastic circular-knit material forming the lower layer had a longitudinal stress of about 30% with respect to the upper and intermediate layers during the ultrasonic welding operation. The anvils disposed below the sonotrode (vibration body 12) were developed in a disc shape and arranged in a rotatable manner so that continuous ultrasonic welding of the two vibratable woven and knit fabrics forming the outer layers of the composite material was possible. Into the parallel extending hollow spaces produced in the longitudinal direction of the welded materials during the welding operation were continuously inserted endless strips of a polyurethane foam having a base of polyether with a weight of 18 kg/m$^3$ and a width and height of 13 mm and 8 mm, respectively. The woven-knit composite material produced in this manner had an extremely low specific gravity, was elastic in all directions, long-wearing, weatherproof, heat-insulating and perspiration-absorbent.

EXAMPLE 3

A warp-knitted fabric forming the upper layer, having a weight of about 200 g/m$^2$ and consisting of about 18% polyurethane yarn and 82% polyamide yarn, and a circular-knit fabric forming the lower layer, consisting of 25% polyamide yarn and 75% cotton yarn, were welded together on an ultrasonic machine in accordance with this invention such that the upper layer was fed to the welding section under a longitudinal stress of about 40% with respect to the intermediate and lower layers. The insertion of the strands of material of the intermediate layer was effected in the same manner previously described in Example 2. The profiled heat-insulating composite material which was produced combined the properties of high elastic, synthetic knitted goods on the outside with the physiological features of cotton on the inside.

EXAMPLE 4

A circular knit fabric forming the outer layer and consisting of polyester yarn having a weight of about 200 g/m$^2$ was welded, with an approximately equal tension, to a circular knit cut-pile material forming the lower layer which was formed of polyester with a weight of about 380 g/m$^2$, on an ultrasonic welding apparatus in accordance with the drawings. Into the parallel extending hollow spaces produced in the longitudinal direction (between the weld seams) during the welding operation were continuously introduced strands of material in the form of endless strips of a polyurethane foam having a base of polyether with a weight of 46 kg/m$^3$. The endless strips had a rectangular cross-section with a width of 13 mm and a height of 12 mm and were inserted with a longitudinal stress of about 30% with respect to the upper and lower layers. The composite material produced in this manner had, after relaxation, a pronounced profile structure, was stable even upon continuous stretching, was highly elastic, and was excellently suited for the upholstering of furniture and for the covering of automobile seats.

EXAMPLE 5

A warp-knitted fabric forming the upper layer and consisting of 82% polyamide yarn and 18% Elasthan yarn (polyurethane yarn) with a weight of about 100 g/m$^3$ was welded on an ultrasonic apparatus in accordance with this invention to a lower layer of a circular knit fabric consisting of 14% polyamide yarn HE, 9% Elasthan yarn and 77% polyester yarn with a weight of 250 g/m$^2$. Into the parallel extending hollow spaces or channels produced in the longitudinal direction during the welding operation were continuously introduced strands of material in the form of endless strips of a closed-cell copolymerization foam having a base of polyethylene/polyvinyl acetate with a weight of about 50 kg/m$^2$. The strands of material each had a rectangular cross-section with a width of 16 mm and a height of 4.5 mm and the strands were introduced between the upper and lower layers with a longitudinal stress of about 20% with respect to the upper and lower layers. After relaxation, the 16 mm wide foam strands completely filled the channels which were formed 14 mm wide and thus increased the thermal insulation and the buoyancy of the composite material in water, the latter being about 3.5 kg/m$^2$. Such materials can be used, for example, as a liner to increase heat insulation and buoyancy (floating aids) for articles of clothing for maritime use.

EXAMPLE 6

A warp-knitted fabric used as the upper layer was formed as in Example 1 and was coated with an elastic polyurethane having a weight of 70 g/m$^2$. Such upper layer was welded with a circular-knit cut-pile fabric (lower layer) of 100% polyamide HE with a weight of about 120 g/m$^2$, with copolymer foam strips (intermediate layer) therebetween, as previously discussed in regard to Example 5, under equal conditions of stress. After relaxation, an excellent heat-insulating, waterproof, elastic material for purposes of maritime use was produced, which had a buoyancy in water of about 3.45 kg/cm$^2$ and thus, had good lifesaving buoyancy properties.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An article of manufacture comprising:
a lower layer;
an upper layer ultrasonically welded to said lower layer along substantially parallel, spaced apart weld seams; and
an intermediate layer disposed between said upper layer and said lower layer, wherein at least one of said upper, lower and intermediate layers is applied with a tensile stress which is different from the tensile stress on at least another of said upper, lower and intermediate layers when said upper layer is ultrasonically welded to said lower layer.

2. The article as defined in claim 1 wherein the intermediate layer is one of a foam or foam laminate material.

3. The article as defined in claim 1 wherein the material in at least one of the lower and the upper layer is under contraction when compared to the material in its relaxed state.

4. The article as defined in claim 2 wherein said one of the foam or foam laminate material is in further subdivision in the cross-section thereof.

5. The article as defined in claim 2 wherein the one of the foam or foam laminate material is comprised of strands of ultrasonically non-weldable materials.

6. A method of producing a composite material of the type having an upper layer, a lower layer and an intermediate layer disposed between said upper layer and said lower layer, comprising the steps of:
ultrasonically welding said upper layer to said lower layer along substantially parallel, spaced apart weld seams;
feeding said intermediate layer between said upper layer and said lower layer during said step of ultrasonically welding; and
applying a tensile stress to at least one of said upper, lower and intermediate layers during said step of ultrasonically welding which is different from the tensile stress on at least another of said upper, lower and intermediate layers.

7. The method of producing a composite material according to claim 6; in which said step of feeding includes the steps of separating said intermediate layer into a plurality of elongated strands of material and feeding said plurality of elongated strands of material between said upper layer and said lower layer and between said weld seams during said step of ultrasonically welding.

8. The method of producing a composite material according to claim 7; in which said step of applying includes the step of applying a tensile stress to the plurality of strands of material of said intermediate layer.

9. The method of producing a composite material according to claim 7; further comprising the step of at least partly subdividing each of said plurality of strands of material in the transverse direction thereof to increase the elasticity of said composite material.

10. The method of producing a composite material according to claim 9; in which said step of subdividing includes the step of impressing a punch-like device on said composite material, said punch-like device being heated to a temperature below the melting point of said upper layer and said lower layer and above the melting point of the strands of material to be subdivided.

11. The method of producing a composite material according to claim 9; in which each of said plurality of strands of material is comprised of two materials with different melting points, and said step of subdividing includes the step of impressing a punch-like device on said plurality of strands of material, said punch-like device being heated to a temperature below the melting point of one of said two materials and above the melting point of the other of said two materials.

12. The method of producing a composite material according to claim 6; in which the tensile stress applied to said upper and lower layers in the longitudinal directions thereof is greater than the tensile stress on the intermediate layer in the longitudinal direction thereof.

13. The method of producing a composite material according to claim 6; in which the tensile stress applied to the intermediate layer in the longitudinal direction thereof when said intermediate layer is fed between said upper layer and said lower layer is greater than the tensile stress on the upper layer and the lower layer.

14. The method of producing a composite material according to claim 6; in which at least one of said upper, lower and intermediate layers has a tensile stress applied thereto so as to be stretched to a value in the range of 1.1 to 1.6 with respect to at least another of said upper, lower and intermediate layers.

15. Apparatus for producing a composite material of the type having an upper layer, a lower layer and an intermediate layer disposed between said upper layer and said lower layer, comprising:
welding means for ultrasonically welding said upper layer to said lower layer along substantially parallel, spaced apart weld seams;
feeding means for feeding said intermediate layer to said welding means between said upper layer and said lower layer; and
tension means for applying a tensile stress to at least one of said upper, lower and intermediate layers supplied to said welding means which is different from the tensile stress on at least another of said upper, lower and intermediate layers.

16. Apparatus for producing a composite material according to claim 15; in which said welding means includes a plurality of spaced apart anvil plates and an oscillating member for ultrasonically welding said upper layer and said lower layer located between said anvil plates and said oscillating body along weld seams determined by the position of said anvil plates.

17. Apparatus for producing a composite material according to claim 16; in which each of said anvil plates is of a disc-like configuration having circumferentially arranged teeth and said plurality of anvil plates are each arranged on a common shaft and adapted to rotate therewith.

18. Apparatus for producing a composite material according to claim 17; in which said plurality of anvil plates are adjustably spaced apart on said common shaft in pairs.

19. Apparatus for producing a composite material according to claim 16; in which a recess section is provided between each of said spaced apart anvil plates into which said intermediate layer is adapted to be fed during the welding operation.

20. Apparatus for producing a composite material according to claim 16; further including separating means for separating said intermediate layer into a plurality of elongated strands of material, and said feeding means includes a plurality of guide means for feeding respective ones of said plurality of strands between said spaced apart anvil plates when said upper layer is ultrasonically welded to said lower layer.

21. Apparatus for producing a composite material according to claim 15; in which said tension means includes at least one pair of rollers for applying a tensile stress to at least one of the upper, lower and intermediate layers.

22. Apparatus for producing a composite material according to claim 21; in which said at least one pair of rollers includes a first pair of rollers for supplying the upper layer to said welding means and for varying the tensile stress on said upper layer supplied to said welding means, a second pair of rollers for supplying the lower layer to said welding means and for varying the tensile stress on said lower layer supplied to said welding means, and a third pair of rollers for supplying the intermediate layer to said welding means and for varying the tensile stress on said intermediate layer supplied to said welding means.

23. Apparatus for producing a composite material according to claim 15; in which said intermediate layer is fed between said upper layer and said lower layer and between said weld seams in the form of elongated strands of material, and said apparatus further includes punch-like means for at least partly subdividing each of said plurality of strands of material in the transverse direction thereof to increase the elasticity of said composite material.

24. Apparatus for producing a composite material according to claim 23; in which said punch-like means includes a punch-like device heated to a temperature below the melting point of said upper layer and said lower layer and above the melting point of the strands of material to be subdivided, said punch-like device being adapted to be impressed on said composite material.

* * * * *